UNITED STATES PATENT OFFICE.

MYRTIL KAHN, OF ELBERFELD, GERMANY, ASSIGNOR TO FARBENFABRIKEN OF ELBERFELD CO., OF NEW YORK, N. Y., A CORPORATION OF NEW YORK.

WOOL-DYE AND PROCESS OF MAKING SAME.

SPECIFICATION forming part of Letters Patent No. 722,716, dated March 17, 1903.

Application filed October 16, 1902. Serial No. 127,603. (Specimens.)

*To all whom it may concern:*

Be it known that I, MYRTIL KAHN, doctor of philosophy, chemist, residing at Elberfeld, Germany, (assignor to the FARBENFABRIKEN OF ELBERFELD CO., of New York,) have invented a new and useful Improvement in Wool-Coloring Matters and Processes of Making Same; and I do hereby declare the following to be an exact and clear description of my invention.

My invention relates to the production of new and valuable azo dyestuffs by combining the diazo derivatives of ortho-amido-cresol sulfonic acids, such as the ortho-amido-ortho-meta and para cresol sulfonic acids having the formulæ:

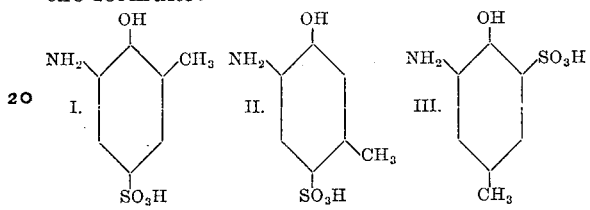

or the like, with 1:5-dioxynaphthalene. The new dyestuffs thus obtained are brownish-black powders, soluble in water with a violet color, turning blue by adding a small quantity of caustic-soda lye, which color is changed to violet by adding a larger quantity of caustic-soda lye, dyeing wool from acid-bath violet-red shades, turning black by a subsequent treatment with chromium compounds, reacting as oxidizing agents. The black shades thus obtained are distinguished by great fastness to the "potting process," which is a finishing process for woolen piece goods. In this process the goods are entered into boiling water and allowed to remain there until the water is cold. The goods thus assume a high degree of gloss and softness, and according to the effect desired the potting may be repeated several times.

In carrying out my process practically I can proceed as follows, the parts being by weight: 20.5 parts of ortho-amido-para-cresol sulfonic acid having the above-given formula III are diazotized in the usual manner, and the resulting diazo compound is stirred into a mixture of sixteen parts of 1:5-dioxynaphtha- lene with ice-water. Caustic-soda lye is added until the mixture is alkaline. The dioxynaphthalene enters into solution, and the formation of the dyestuff begins. After being stirred for some hours the excess of caustic-soda lye is neutralized by means of hydrochloric acid, and the new dyestuff is precipitated by the addition of common salt, filtered off, and dried. The new coloring-matter thus obtained is when dry and pulverized a brownish-black powder soluble in water with a violet color and soluble in concentrated sulfuric acid of 66° Baumé with a bluish-black color, turning violet by the addition of ice, a dark precipitate being obtained. It dyes wool from acid-bath violet-red shades. By subsequently treating the dyed fiber with chromium compounds reacting as oxidizing agents—such as chromates, bichromates, or the like—the shades are changed to deep black, distinguished for great fastness to the potting process. They also resist milling and washing and possess a good fastness against the action of light.

Having now described my invention, what I claim is—

1. The herein-described process for the manufacture of new azo dyestuffs for wool, which consists in first combining the diazo compounds of ortho-amido-cresol sulfonic acids with 1:5-dioxynaphthalene and secondly isolating the monoazo dyestuffs thus produced, substantially as hereinbefore described.

2. The herein-described process for the manufacture of a new monoazo dyestuff for wool, which consists in first combining diazotized ortho-amido-para-cresol sulfonic acid having the above-given formula with 1:5-dioxynaphthalene and secondly isolating the dyestuff thus produced, substantially as described.

3. The herein-described new azo dyestuffs derived from ortho-amido-cresol sulfonic acids and 1:5-dioxynaphthalene, which, when in a dry state, are brownish-black powders soluble in water with a violet color turning blue by adding a small quantity of caustic-soda lye which color is changed to violet by adding a larger quantity of caustic-soda lye; dyeing wool from acid-bath violet-red shades turning black by a subsequent treatment with chromium compounds reacting as oxidizing agents, substantially as hereinbefore described.

4. The herein-described new azo dyestuff derived from ortho-amido-para-cresol sulfonic acid and 1:5-dioxynaphthalene, which is, when dry and pulverized, a brownish-black powder soluble in water with a violet color and being soluble in concentrated sulfuric acid of 66° Baumé with a bluish-black color turning violet by adding ice, a dark precipitate being obtained and dyeing wool from acid-bath violet-red shades which are changed to deep black by a subsequent treatment with chromium compounds reacting as oxidizing agents, substantially as hereinbefore described.

In testimony whereof I have signed my name in the presence of two subscribing witnesses.

MYRTIL KAHN.

Witnesses:
OTTO KÖNIG,
T. A. RITTERSHAUS.